United States Patent
Ma et al.

(10) Patent No.: US 12,372,711 B2
(45) Date of Patent: Jul. 29, 2025

(54) GLASS ASSEMBLY AND WINDOW ASSEMBLY

(71) Applicant: SAINT-GOBAIN GLASS FRANCE, Courbevoie (FR)

(72) Inventors: Siteng Ma, Shanghai (CN); Jiankai Yu, Shanghai (CN); Lu Wang, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/846,581

(22) PCT Filed: Mar. 10, 2023

(86) PCT No.: PCT/CN2023/080686
§ 371 (c)(1),
(2) Date: Sep. 12, 2024

(87) PCT Pub. No.: WO2023/174166
PCT Pub. Date: Sep. 21, 2023

(65) Prior Publication Data
US 2025/0189716 A1    Jun. 12, 2025

(30) Foreign Application Priority Data
Mar. 14, 2022 (CN) .......................... 202210246616.1

(51) Int. Cl.
*F21V 8/00* (2006.01)
(52) U.S. Cl.
CPC ................................ *G02B 6/0066* (2013.01)
(58) Field of Classification Search
CPC ............ G02B 6/0066; B32B 17/10064; B32B 17/10036; B60Q 3/208
See application file for complete search history.

(56) References Cited

U.S. PATENT DOCUMENTS 9,291,325 B2 * 3/2016 Verrat-Debailleul ....................... G02B 6/0095

FOREIGN PATENT DOCUMENTS

| CN | 106605308 A | 4/2017 |
|---|---|---|
| CN | 108136741 A | 6/2018 |
| CN | 108700283 A | 10/2018 |
| CN | 108990414 A | 12/2018 |
| WO | WO 2020/184714 A1 | 9/2020 |

OTHER PUBLICATIONS

International Search Report as issued in International Patent Application No. PCT/CN2023/080686, dated Jun. 15, 2023.

* cited by examiner

*Primary Examiner* — Robert J May
(74) *Attorney, Agent, or Firm* — Pillsbury Winthrop Shaw Pittman LLP

(57) ABSTRACT

A glass assembly includes a first glass body and a second glass body attached to each other through an intermediate layer, the first glass body and/or the second glass body being provided with an opening or openings suitable for accommodating electronic device, and the electronic device at least including a light-emitting component. A sealing component is arranged between the intermediate layer and the opening to isolate the intermediate layer from the outside of the glass assembly, wherein at least a surface of the sealing component facing the opening is non-reflective, and the refractive index of the sealing component is smaller than that of the intermediate layer.

10 Claims, 2 Drawing Sheets

GLASS ASSEMBLY AND WINDOW ASSEMBLY

CROSS-REFERENCE TO RELATED APPLICATIONS

This application is the U.S. National Stage of PCT/CN2023/080686, filed Mar. 10, 2023, which in turn claims priority to Chinese patent application number 202210246616.1 filed Mar. 14, 2022. The content of these applications are incorporated herein by reference in their entirety.

FIELD

The present disclosure relates to the technical field of glass, in particular to a glass assembly and a window assembly using the same.

BACKGROUND

With the rapid development of automobile industry and the increasing demand of consumers for vehicle functions, luminous glass with lighting effect has been widely valued by vehicle manufacturers and favored by the consumers. The luminous glass in active luminous mode is expensive, which is not conducive to universal implementation. Therefore, the luminous glass with lighting effect usually forms a pattern area by laminating a microstructure film layer into the glass, or micro-carving or applying light extraction materials such as luminous enamel or ink on the surface of the glass based on pattern design. After incident light emitted by a light source arranged on the side of the glass or integrated in the glass is totally reflected in the glass and projected to the pattern area, the light is scattered or diffused and passes through the pattern area due to the change of surface structure, thus achieving different luminous effects.

For the light source integrated in the glass, in the area close to the light source, especially around the hole used to embed the light source in the glass, the light emitted by the light source is prone to halo phenomenon or lighting ring phenomenon, thus affecting the user's sensory comfort. Therefore, how to reduce the size or brightness of halo is one of the keys to improve the lighting effect of the luminous glass.

SUMMARY

The object of the present disclosure is to provide a glass assembly with improved luminous function on the premise of not affecting the sealing performance, and the glass assembly can alleviate or eliminate the halo effect, thereby improving the illumination performance and enhancing the user experience.

To this end, according to one aspect of the present disclosure, a glass assembly is provided. The glass assembly comprises a first glass body and a second glass body attached to each other through an intermediate layer, the first glass body and/or the second glass body being provided with an opening or openings suitable for accommodating electronic device, and the electronic device at least comprising a light-emitting component; wherein a sealing component is arranged between the intermediate layer and the opening to isolate the intermediate layer from the outside of the glass assembly, and wherein at least a surface of the sealing component facing the opening is non-reflective, and the refractive index of the sealing component is smaller than that of the intermediate layer.

By alleviating the halo effect, the comfort of users is enhanced.

According to the above technical concept, the embodiment of the present disclosure may further include any one or more of the following alternative forms.

In some alternative forms, the sealing component is a transparent component.

In some alternative forms, the refractive index of the sealing component is selected from the range of 1.34-1.47.

In some alternative forms, the cross-sectional dimension of the sealing component is approximately equal to the cross-sectional dimension of the opening.

In some alternative forms, the edge of the sealing component exceeds the edge of the opening by a distance of 5-10 mm.

In some alternative forms, the sealing component is a film layer made of acrylate polymer or fluoropolymer.

In some alternative forms, the sealing component is made of fluorinated ethylene propylene copolymer or ethylene-tetrafluoroethylene copolymer.

In some alternative forms, the sealing component is a single-layer film or formed by laminating multiple layers of films.

According to another aspect of the present disclosure, a window assembly is provided. The window assembly comprises a glass assembly mentioned above, wherein the window assembly comprises door, window, curtain wall, vehicle window glass, airplane glass or ship glass.

In some alternative forms, the window assembly is a vehicle window glass comprising front windshield, rear windshield, skylight glass, vehicle door glass or corner window glass, wherein the first glass body faces the outside of the vehicle and the second glass body faces the inside of the vehicle, and the second glass body is provided with an opening suitable for accommodating electronic device at least comprising a light-emitting component.

The glass assembly of the present disclosure can alleviate or eliminate the halo phenomenon generated at the light source on the premise of not affecting the performance and aesthetics of the glass itself, and improve the user experience. The glass assembly of the present disclosure is easy to implement and has obvious performance improvement, and can be applied to various occasions to meet the diversified requirements of users.

BRIEF DESCRIPTION OF THE DRAWINGS

Other features and advantages of the present disclosure will be better understood by the following alternative embodiments described in detail in conjunction with the accompanying drawings, in which the same reference numerals identify the same or similar components, in the drawings.

DETAILED DESCRIPTION OF EMBODIMENTS

Figure 1A:
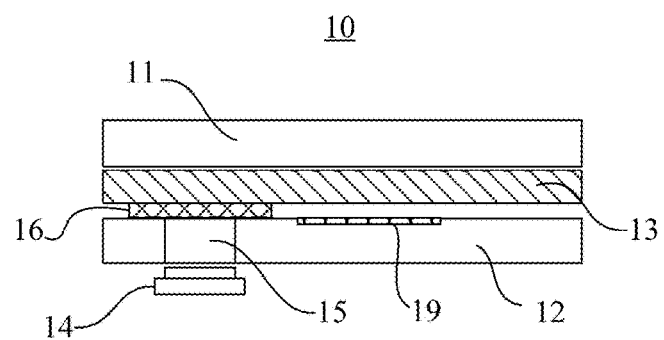
FIG. 1A is a schematic view of a lighting mode of a glass assembly, in which a through hole is provided in the glass for embedding a light-emitting component in the glass.

The implementation and use of the embodiments are discussed in detail below.

However, it should be understood that the specific embodiments discussed merely exemplify the specific ways of implementing and using the present disclosure, and do not limit the scope of the disclosure. When describing the structural positions of various components, such as the directions of upper, lower, top, bottom, etc., the description is not absolute, but relative. When the various components are arranged as shown in the figures, these directional expressions are appropriate, but when the positions of the various components in the figures would be changed, these directional expressions would also be changed accordingly.

In this context, the expression "comprising" or similar expressions "including", "containing" and "having" which are synonymous are open, and do not exclude additional unlisted elements, steps or ingredients. The expression "consisting of . . . " excludes any element, step or ingredient that is not specified. The expression "consisting essentially of . . . " means that the scope is limited to the specified elements, steps or ingredients, plus the optional elements, steps or ingredients that do not materially affect the basic and new features of the claimed subject matter. It should be understood that the expression "comprising" covers the expressions "consisting essentially of" and "consisting of".

In this context, the terms "first", "second" and so on are not used to limit the sequence and the number of components unless otherwise stated.

In this context, the meanings of "a plurality of" and "multiple layers" refer to two or more than two, unless otherwise specified.

In this context, unless otherwise specified, the terms such as "installation", "connection" and "attach" should be understood broadly. For example, it can be fixed connection, detachable connection or integrated; it can be directly connected or indirectly connected through an intermediate medium, and it can be the internal communication of two components or the interaction between two components. For those skilled in the art, the specific meanings of the above terms in this context can be understood according to specific situations.

In this context, "glass" is an amorphous inorganic non-metallic material, which is generally made of a variety of inorganic minerals (such as quartz sand, borax, boric acid, barite, barium carbonate, limestone, feldspar, soda ash, etc.) as main raw materials, and a small amount of auxiliary raw materials. Its main components are silica and other oxides. In the described embodiments, unless otherwise specified, the thickness of the glass is the thickness commonly used in the art, and the thickness of each laminated structure on the glass is suitable for the conventional range, and is not limited as shown in the figures. In addition, although it is shown as plane glass in the figures, the glass of the present disclosure may also be curved glass. In various embodiments, it is described as an independent glass body or glass plate. However, in some cases, the surface of the glass can also use a special coating to improve thermal insulation and/or comfort.

Hereinafter, the glass assembly applied to the vehicle window glass will be described, but it is not excluded that the glass assembly can be applied to door, window, curtain wall, airplane glass or ship glass. When the glass assembly is used to describe the window glass of a vehicle, "outside" and "inside" refer to the directions relative to vehicle body, "outside" refers to the direction away from the vehicle body and "inside" refers to the direction facing the vehicle body. It should be understood that the vehicle window glass according to the embodiment of the present disclosure includes, but is not limited to, front windshield, rear windshield, skylight glass, vehicle door glass or corner window glass, which can provide different illumination effects based on different requirements.

In the ever-changing automobile industry, glass assembly with lighting and decorative effects has been widely used in such as vehicle skylight of mid-to-high-end vehicles, which can not only achieve the effects of light shading and/or color change, but also form lighting effects with different patterns by combining coatings and/or sandwich structures.

Figure 1B:
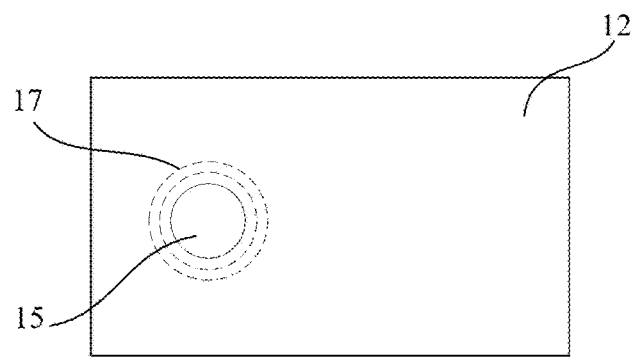
FIG. 1B is a schematic view from below in FIG. 1A, showing a halo phenomenon generated by incident light of the light-emitting component at the through hole without a sealing component.
Figure 1C:
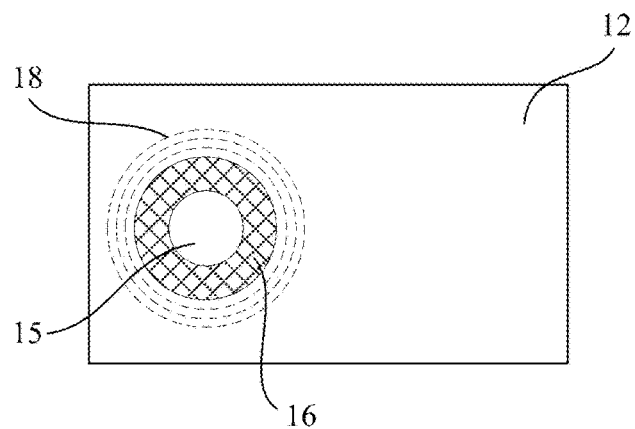
FIG. 1C is similar to FIG. 1B, showing the halo phenomenon generated by the incident light of the light-emitting component at the through hole in the case of having a sealing component.

FIG. 1A illustrates a glass assembly 10 with luminous effect according to a lighting mode. The glass assembly 10 includes a first glass body 11, a second glass body 12, and an intermediate layer 13 interposed between the first glass body 11 and the second glass body 12. When applied to the vehicle window glass, the first glass body 11 can be called outer glass, and the second glass body 12 can be called inner glass. The first glass body 11 and the second glass body 12 are bonded together by the intermediate layer 13, such as PVB (polyvinyl butyral) or EVA (ethylene-vinyl acetate copolymer). According to different requirements, electronic devices can be inserted into the first glass body 11 and/or the second glass body 12 to realize electronic induction, electric control, lighting and other functions. The electronic devices can include light-emitting component, sensing component, control component and the like. In the illustrated mode, the light-emitting component 14 is, for example, a point or linear light source integrated in the second glass body 12, and the second glass body 12 is correspondingly provided with a through hole 15 for the light-emitting component 14 to be embedded. Generally, a sealing foil 16, such as aluminum foil, is arranged between the intermediate layer 13 and the through hole 15 for isolating the intermediate layer from the outside air during the lamination process of the glass assembly to play a sealing role. Due to the high reflectivity of the aluminum foil, the light emitted by the light-emitting component 14 is reflected on the surface of the sealing foil 16, which will not significantly reduce the brightness of the light at pattern area 19, but will cause a larger halo at the light source. As shown in FIG. 1B, when there is no sealing foil, a lighting ring 17 generated by the light-emitting component at the through hole 15 is shown by a dotted line. When the sealing foil 16 is used, as shown in FIG. 1C, the aluminum foil cannot absorb the light projected on its surface, and then the light at various angles would be reflected on the surface, resulting in a lighting ring 18 with an increased size at the through hole 15, which means that the halo is diffused to a more external area due to the reflectivity of the sealing foil 16. Further, the glass assembly will have defects similar to light leakage at the light source, causing users' sensory discomfort.

In order to make the halo size smaller, improve the halo phenomenon, or even eliminate the halo phenomenon, it is necessary to remove the highly reflective surface. However, in order to maintain the function of air sealing in the lamination process, a sealing component is required between the intermediate layer and the through hole in the glass assembly. Therefore, how to improve the sealing component is the key to reduce or eliminate the halo.

Figure 2A:
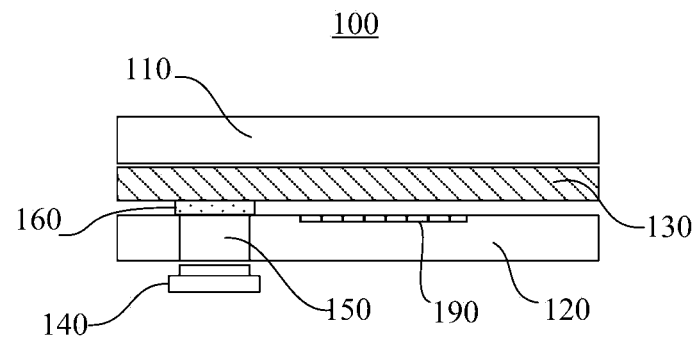
FIG. 2A is a schematic view of a glass assembly according to an embodiment of the present disclosure.

FIG. 2A illustrates a glass assembly 100 according to an embodiment of the present disclosure. The glass assembly 100 includes a first glass body 110 and a second glass body 120 attached to each other through an intermediate layer 130, wherein the second glass body 120 is provided with an opening 150 to accommodate electronic device at least comprising a light-emitting component 140. A sealing component 160 is provided between the intermediate layer 130 and the opening 150 to isolate the intermediate layer 130 from the outside of the glass assembly 100. The sealing component 160 is configured such that at least the surface facing the opening 150 is non-reflective, and the refractive index of the sealing component 160 is configured to be smaller than that of the intermediate layer 130. For example, if PVB is used as the intermediate layer, the refractive index of the sealing component is configured to be smaller than 1.48. In this way, there is no reflection on the surface of the sealing component facing the through hole, thereby reducing the generation of halo, and the existence of the sealing component does not change the total reflection of the incident light in the second glass body, thus ensuring the lighting effect of the glass assembly.

Advantageously, the sealing component is a transparent component, so that its surface is non-reflective.

In some embodiments, the refractive index of the sealing component is selected from the range of 1.34-1.47.

In some embodiments, the sealing component is a film layer made of acrylate polymer or fluoropolymer. The acrylate polymer can be selected from materials with refractive index of about 1.45-1.47. By way of example, materials that can be used to manufacture fluoropolymer film layer include polytetrafluoroethylene (PTFE), polyvinylidene fluoride (PVDF, with refractive index of about 1.43), fluorinated ethylene propylene copolymer (FEP, with refractive index of about 1.34), polyvinyl fluoride (PVF) and ethylene-tetrafluoroethylene copolymer (ETFE, with refractive index of about 1.4). Alternatively, the sealing component of the present disclosure is made of fluorinated ethylene propylene copolymer (FEP) or ethylene-tetrafluoroethylene copolymer (ETFE). The refractive index of FEP is about 1.34, and the refractive index of ETFE is about 1.4, both of which can meet the conditions of the refractive index being smaller than that of the intermediate layer such as PVB and transparent material.

Alternatively, the sealing component is a single-layer film or is formed by laminating multiple layers of films. In some embodiments, the sealing component can be adhered to the second glass body before applying the intermediate layer between the two glass bodies. Alternatively, the sealing component can be attached to the intermediate layer and then the intermediate layer combined with the sealing component can be attached to the second glass body. In any case, because the acrylate polymer or the fluoropolymer itself has good adhesiveness, the sealing component can be reliably adhered to the intermediate layer and the glass body during the lamination process, thus avoiding the additional assembly and fixing process of the sealing component in the form of for example, metal foil, simplifying the preparation process and reducing the production cost.

In some embodiments, the cross-sectional dimension of the sealing component 160 is approximately equal to the cross-sectional dimension of the opening 150, so as to avoid the influence of the edge of the sealing component on the incident light. It should be understood that the cross-sectional shape of the opening can be circular, elliptical or polygonal, the size of the sealing component should be as small as possible, and the cross-sectional shape of the sealing component should be adapted to the cross-sectional shape profile of the opening, so that the cross-sectional size of the opening can be completely covered. "Approximately equal to" means that the edge of the sealing component exceeds the edge of the opening by no more than 10 mm.

In some embodiments, the edge of the sealing component exceeds the edge of the opening by a distance of 5-10 mm to facilitate assembly. For example, when the cross-sectional shape of the opening is circular and its aperture diameter is 20 mm, the sealing component can be circular and its diameter is 30 mm.

It should be understood that the thickness of the sealing component should generally be less than that of the intermediate layer. When in the form of polymer film layer, the sealing component and the intermediate layer will be heated and melted during the lamination process to adhere to each other. In some embodiments, the thickness of the sealing component can be selected from the range of 0.01-0.5 mm depending on the properties of the selected material.

Figure 2B:
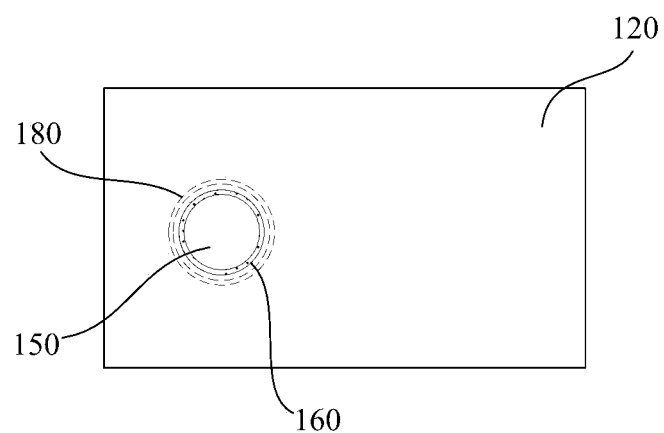
FIG. 2B is a schematic view from below in FIG. 2A, showing a reduced halo generated by the incident light of the light-emitting component in the case of having a sealing component.

With the above design, since the sealing component 160 between the intermediate layer 130 and the second glass body 120 for sealing the opening 150 is made of a non-reflective material with a refractive index smaller than that of the intermediate layer 130, the incident light emitted by the light-emitting component 140 will not be reflected when projected on the surface of the sealing component 160, but will be scattered out of the second glass body 120 from the pattern area 190 after being transmitted and totally reflected in the second glass body 120, thus reducing or eliminating the halo phenomenon at the light source while ensuring the lighting effect. As shown in FIG. 2B, compared with that shown in FIG. 1C, in the glass assembly using the sealing component 160 of the present disclosure, the size of the lighting ring 180 at the light source is effectively reduced, and the comfort of passengers is enhanced. The glass assembly of the present disclosure has little change to the existing design but obvious performance improvement, simple process and easy wide application.

In the described or not described possible embodiments, the monolithic first glass body and/or the second glass body can be chosen as laminated glass, and various functional layers can be arranged in the laminated glass to obtain different functions, such as dimming layer (such as PDLC, polymer dispersed liquid crystal; or EC, electrochromic), luminescent layer, imaging layer, touch layer, etc. The present disclosure does not exclude the use of the above functional layers in the glass assembly.

It should be understood here that the embodiments shown in the drawings only illustrate the optional architectures, shapes, sizes and arrangements of various optional components of the glass assembly according to the present disclosure; however, it is only illustrative rather than restrictive, and other shapes, sizes and arrangements can be adopted without departing from the spirit and scope of the present disclosure.

The technical content and technical features of the present disclosure have been disclosed above. However, it can be understood that those skilled in the art can make various changes and improvements to the above disclosed concept under the creative idea of the present disclosure, all of which fall within the protection scope of the present disclosure. The description of the above embodiments is illustrative rather than restrictive, and the protection scope of the present disclosure is determined by the claims.

The invention claimed is:

1. A glass assembly comprising a first glass body and a second glass body attached to each other through an intermediate layer, the first glass body and/or the second glass body being provided with an opening or openings configured to accommodate electronic device, and the electronic device at least comprising a light-emitting component;
wherein a sealing component is arranged between the intermediate layer and the opening to isolate the intermediate layer from the outside of the glass assembly, and wherein at least a surface of the sealing component facing the opening is non-reflective, and a refractive index of the sealing component is smaller than that of the intermediate layer.

2. The glass assembly according to claim 1, wherein the sealing component is a transparent component.

3. The glass assembly according to claim 1, wherein the refractive index of the sealing component is selected from the range of 1.34-1.47.

4. The glass assembly according to claim 1, wherein a cross-sectional dimension of the sealing component is approximately equal to a cross-sectional dimension of the opening.

5. The glass assembly according to claim 4, wherein an edge of the sealing component exceeds an edge of the opening by a distance of 5-10 mm.

6. The glass assembly according to claim 1, wherein the sealing component is a film layer made of acrylate polymer or fluoropolymer.

7. The glass assembly according to claim 6, wherein the sealing component is made of fluorinated ethylene propylene copolymer or ethylene-tetrafluoroethylene copolymer.

8. The glass assembly according to claim 6, wherein the sealing component is a single-layer film or formed by laminating multiple layers of films.

9. A window assembly comprising a glass assembly according to claim 1, wherein the window assembly comprises door, window, curtain wall, vehicle window glass, airplane glass or ship glass.

10. The window assembly according to claim 9, wherein the window assembly is a vehicle window glass comprising front windshield, rear windshield, skylight glass, vehicle door glass or corner window glass, wherein the first glass body faces the outside of the vehicle and the second glass body faces the inside of the vehicle, and the second glass body is provided with an opening suitable for accommodating electronic device at least comprising a light-emitting component.

* * * * *